US009208798B2

(12) United States Patent
Ward et al.

(10) Patent No.: US 9,208,798 B2
(45) Date of Patent: Dec. 8, 2015

(54) DYNAMIC CONTROL OF VOICE CODEC DATA RATE

(71) Applicants: Nigel Ward, El Paso, TX (US); Timo Baumann, Hamburg (DE); Shreyas A. Karkhedkar, El Paso, TX (US); David G. Novick, El Paso, TX (US)

(72) Inventors: Nigel Ward, El Paso, TX (US); Timo Baumann, Hamburg (DE); Shreyas A. Karkhedkar, El Paso, TX (US); David G. Novick, El Paso, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 318 days.

(21) Appl. No.: 13/858,605

(22) Filed: Apr. 8, 2013

(65) Prior Publication Data

US 2014/0303968 A1 Oct. 9, 2014

(51) Int. Cl.
  *G10L 21/00* (2013.01)
  *G10L 25/90* (2013.01)
  *G10L 19/22* (2013.01)
  *G10L 17/26* (2013.01)

(52) U.S. Cl.
  CPC .............. *G10L 25/90* (2013.01); *G10L 19/22* (2013.01); *G10L 17/26* (2013.01)

(58) Field of Classification Search
  CPC ..... G10L 19/24; G10L 25/90; G10L 19/0204; G10L 19/06; G10L 19/125; G04N 19/115; H04B 1/667
  USPC ......... 704/207, 500, 270, 230, 229, 223, 219, 704/208, 205; 84/662; 706/46; 386/353; 381/98, 86; 375/240.09, 240.02; 348/497, 14.12
  See application file for complete search history.

(56) References Cited

U.S. PATENT DOCUMENTS

| | | | |
|---|---|---|---|
| 5,521,330 A * | 5/1996 | Kuwano | G10H 1/125 84/662 |
| 5,539,833 A * | 7/1996 | Yamashita | H03G 5/10 330/124 R |
| 6,418,407 B1 * | 7/2002 | Huang | G10L 25/90 704/207 |
| 6,424,938 B1 | 7/2002 | Johansson et al. | |
| 6,647,366 B2 | 11/2003 | Wang et al. | |
| 6,772,126 B1 * | 8/2004 | Simpson | G10L 19/24 704/222 |
| 7,027,982 B2 | 4/2006 | Chen et al. | |
| 7,272,556 B1 * | 9/2007 | Aguilar | G10L 19/093 704/201 |
| 7,298,736 B1 | 11/2007 | Matthews | |
| 7,624,008 B2 | 11/2009 | Beerends et al. | |
| 7,860,509 B2 | 12/2010 | Håkansson et al. | |
| 7,933,226 B2 | 4/2011 | Woodruff et al. | |
| 8,135,061 B1 * | 3/2012 | Ganesan | H04N 19/115 375/240.02 |
| 8,190,428 B2 | 5/2012 | Yamaura | |
| 8,244,528 B2 | 8/2012 | Niemisto et al. | |
| 8,260,609 B2 | 9/2012 | Rajendran et al. | |
| 8,289,952 B2 | 10/2012 | Larsson et al. | |
| 8,787,454 B1 * | 7/2014 | Chechik | H04N 7/50 375/240.01 |
| 2002/0128829 A1 * | 9/2002 | Yamaura | G10L 19/12 704/223 |

(Continued)

*Primary Examiner* — Michael Colucci
(74) *Attorney, Agent, or Firm* — Kermit D. Lopez; Luis M. Ortiz; Ortiz & Lopez, PLLC (57) ABSTRACT

A method, system, and computer-usable non-transitory storage device for dynamic voice codec adaptation are disclosed. The voice codec adapts in real time to devote more bits to audio quality when it is most needed, and fewer bits to less important parts of utterances are disclosed. Dialog knowledge is utilized for compression opportunities to adjust the bitrate moment-by-moment, based on the inferred value of each frame. Frame importance and appropriate transmission fidelity is predicted based on prosodic features and models of dialog dynamics. This technique provides the same communications quality with less spectrum needs, fewer antennas, and less battery drain.

17 Claims, 8 Drawing Sheets

(56) References Cited

U.S. PATENT DOCUMENTS

| | | | |
|---|---|---|---|
| 2005/0119894 A1* | 6/2005 | Cutler | G10L 17/26 704/270 |
| 2006/0215016 A1* | 9/2006 | Cohen | H04N 7/148 248/14.12 |
| 2007/0104185 A1 | 5/2007 | Walter et al. | |
| 2007/0219791 A1 | 9/2007 | Gao et al. | |
| 2007/0269054 A1* | 11/2007 | Takagi | A63F 13/10 381/86 |
| 2008/0219244 A1 | 9/2008 | Malhotra et al. | |
| 2009/0192961 A1* | 7/2009 | Fithian | G06N 5/04 706/46 |
| 2009/0319263 A1* | 12/2009 | Gupta | G10L 19/10 704/229 |
| 2010/0057473 A1 | 3/2010 | Kong et al. | |
| 2010/0114566 A1* | 5/2010 | Sung | G10L 19/22 704/219 |
| 2011/0029304 A1* | 2/2011 | Chen | G10L 19/22 704/208 |
| 2011/0122786 A1 | 5/2011 | Koo et al. | |
| 2011/0151880 A1 | 6/2011 | So et al. | |
| 2011/0235500 A1 | 9/2011 | Shenoi | |
| 2012/0141098 A1* | 6/2012 | Aoki | H04N 9/802 386/353 |
| 2012/0169929 A1* | 7/2012 | Plasberg | H04N 21/44004 348/497 |
| 2012/0303362 A1* | 11/2012 | Duni | G10L 25/93 704/219 |
| 2013/0066641 A1* | 3/2013 | Bruhn | H04M 3/569 704/500 |
| 2014/0122065 A1* | 5/2014 | Daimou | G10L 19/24 704/205 |

* cited by examiner

DYNAMIC CONTROL OF VOICE CODEC DATA RATE

GOVERNMENT RIGHTS STATEMENT

This invention was made with government support under IIS-0914868 awarded by the National Science Foundation. The government has certain rights in the invention.

CROSS REFERENCE TO RELATED APPLICATIONS

This patent application claims the benefit under 35 U.S.C. §119(e) of U.S. Provisional Patent Application Ser. No. 61/621,760 filed on Apr. 9, 2012 and entitled "DYNAMIC CONTROL OF VOICE CODEC DATA RATE," which is hereby incorporated by reference in its entirety.

TECHNICAL FIELD

Embodiments relate to imprinting polymers. Embodiments also relate to molecular imprinting of high molecular weight compounds. Embodiments further relate to colored silica beads with imprinted antibody binding sites.

BACKGROUND OF THE INVENTION

Voice codecs retain a circuit-based mentality. In particular, codecs retain the implicit assumption that all speech is equally valuable. For example, a "uh-huh" or a word repetition in speech is generally transmitted at the same bitrate as actual content words. One needs the ability to dynamically vary the data rate based on the inferred value of each frame.

Therefore, a need exists for a voice codec that adapts in real time to devote more bits to audio quality when it is most needed, and fewer to less important parts of utterances. This technique provides advantages including the same communication quality with less spectrum needs, fewer antennas, and less battery drain.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is another aspect of the disclosed embodiments to provide for an improved voice codec.

It is a further aspect of the disclosed embodiments to provide for a dynamically adaptable voice codec that varies the data rate for voice transmissions, and for other applications.

The above and other aspects can be achieved as is now described. A method, system, and apparatus for a voice codec that adapts in real time to devote more bits to audio quality when it is most needed, and fewer to less important parts of utterances is disclosed. Dialog knowledge is utilized for compression opportunities to adjust the bitrate moment-by-moment, based on the inferred value of each frame. Frame importance and accordingly the appropriate transmission fidelity is predicted based on prosodic features and models of dialog dynamics. This technique provides the same communications quality with less spectrum needs, fewer antennas, and less battery drain.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

The embodiments now will be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
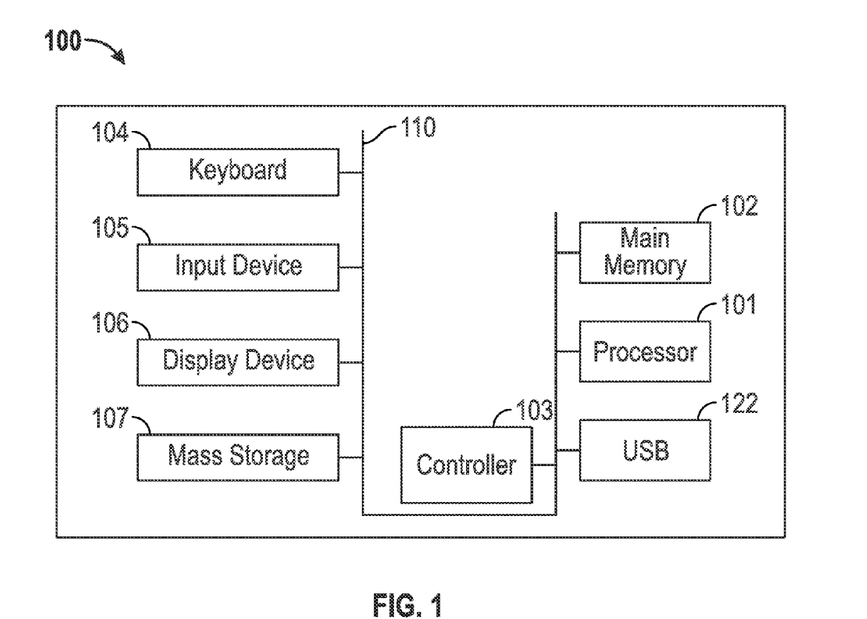
FIG. 1 illustrates an exemplary schematic view of a data-processing system, according to a preferred embodiment.
Figure 2:
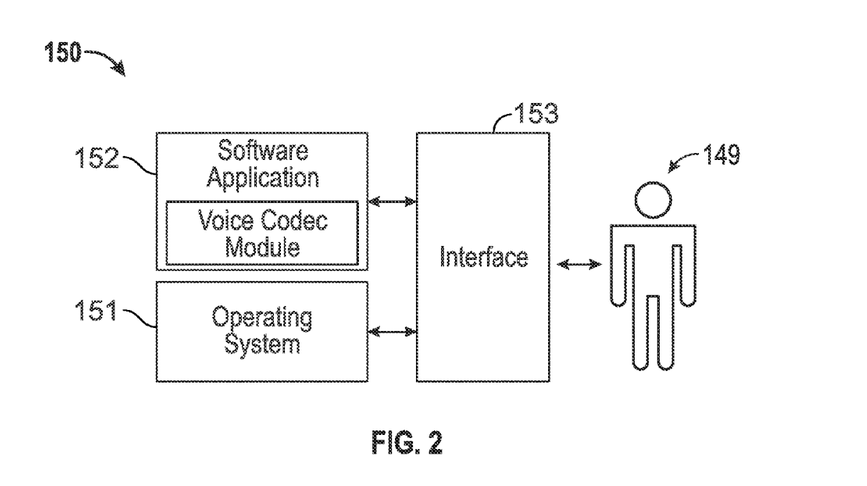
FIG. 2 illustrates an exemplary schematic view of a software system including an operating system, application software, and a user interface, according to an embodiment.
Figure 3:
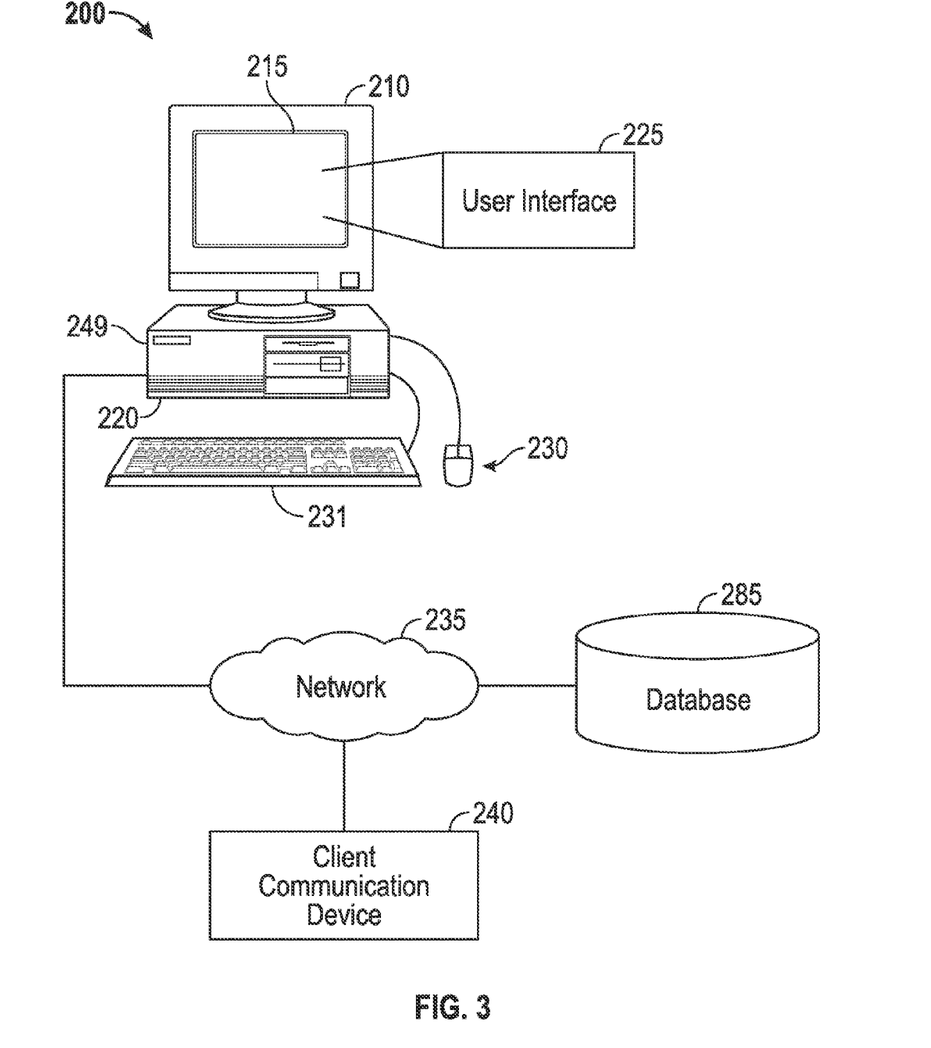
FIG. 3 illustrates an exemplary graphical representation of a client communication device connected to a network of data-processing systems, according to an embodiment.

FIGS. 1-3 are provided as exemplary diagrams of data-processing environments in which embodiments of the present invention may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the present invention.

FIG. 1 illustrates an exemplary schematic view of a data-processing system 100, according to a preferred embodiment. As illustrated in FIG. 1, the disclosed embodiments may be implemented in the context of a data-processing system 100 comprising, for example, a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a rendering device 108 (e.g., printer, scanner, fax machine, etc), for example, may be associated with the data-processing system 100 as desired. As illustrated, the various components of data-processing system 100 communicate electronically through a system bus 110 or similar architecture. The system bus 110 may be a subsystem that transfers data between, for example, computer components within data-processing system 100 or to and from other data-processing devices, components, computers, etc.

FIG. 2 illustrates a computer software system 150 for directing the operation of the data-processing system 100 depicted in FIG. 1, according to an embodiment. Voice codec software application module 152, stored in main memory 102 and/or on mass storage 107, generally is controlled by a kernel or operating system 151 and/or a shell or interface 153, possibly under direct or indirect control by a user 149.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as machine translation, speech summarization, information retrieval etc. Such a module may also constitute a software application such as a "plug-in." Note that the term plug-in as utilized herein refers generally to a computer program that interacts with a host application (e.g., a Web browser) to provide a certain, usually very specific, function "on demand." The terms "plug-in" and "plug-in module" and "module" may be utilized interchangeably to refer to the same component or application.

Those skilled in the art will appreciate that the disclosed method and system may be practiced with other computer system configurations such as, for example, hand-held devices, multi-processor systems, data networks, microprocessor-based or programmable consumer electronics, networked PCs, minicomputers, mainframe computers, servers, and the like.

The descriptions herein are presented with respect to particular embodiments of the present invention, which may be embodied in the context of a data-processing system such as, for example, data-processing system 100 and computer software system 150 illustrated with respect to FIGS. 1-3. Such embodiments, however, are not limited to any particular application or any particular computing or data-processing environment. Instead, those skilled in the art will appreciate that the disclosed system and method may be advantageously applied to a variety of system and application software. Moreover, the present invention may be embodied on a variety of different computing platforms including Mac iOS®, UNIX®, LINUX®, and the like.

FIG. 3 illustrates a pictorial illustration 200 of a client communication device coupled to a data-processing apparatus through a network, according to an embodiment. FIG. 3 is provided as an exemplary diagram of data processing environments in which embodiments of the present invention can be implemented. It should be appreciated that FIG. 3 is only exemplary and is not intended to assert or imply any limitation with regard to the environments in which aspects or embodiments of the present invention can be implemented. Many modifications to the depicted environments can be made without departing from the spirit and scope of the present invention.

Referring to FIG. 3, system 200 includes a client communication device 240 that communicates with a data-processing system 210 through a network 235. The data-processing system 210 can be, for example, a personal computer or other computing device, and may include a central processor 220, a display device 215, a keyboard 231, and/or a pointing device 230 (e.g., mouse, track ball, pen device, or the like). Note that in other embodiments, the client communication device 240 may communicate directly with the data-processing system 210, rather than through a network such as, for example, network 235. The network 235 can be coupled to a database 285.

Note that as utilized herein, the term client communication device 240 may refer to a mobile communication device, mobile client device, client device, device, client, telephone, mobile telephone, and/or computer terminal and may be referred to in the singular or plural form. For example, a mobile communication device may include devices such as the Apple® iPhone®, the Apple® iPad®, the Palm® Pre®, or any device running the Apple® iOS, Android® OS, Google® Chrome® OS, Symbian® OS, Windows® Mobile OS, Palm® OS or Palm Web® OS. Communication between client communication device 240 and network 235 may utilize a variety of networking protocols and security measures. Additionally, to ensure that client communication device 240 has authority to access network 235, and/or to verify the identity of mobile communication client communication device 240, client communication device 240 may send one or more identifiers or authentication credentials to network 235. For example, authentication credentials may include a user name and password, device-specific credentials, or any other data that identifies client communication device 240 to network 235. Authentication may allow network 235 to store information specific to client communication device 240 or an account associated with client communication device 240, to provide customized services to client communication device 240.

The data-processing system 210 can communicate with the device 240 through, for example, a computer network 235 or other networking configuration. Network 235 may employ any network topology, transmission medium, or network protocol. Network 235 may include connections, such as wire, wireless communication links, or fiber optic cables. The client communication device 240 may include a user interface, such as a panel menu. The panel menu can be employed to select features and enter other data in the client communication device 240. Such interfaces may include, for example, touch screens having touch-activated keys for navigating through an option menu or the like.

Client communication device 240 may operate in a communication network. The communication network may include, but is not limited to an Enhanced Data Global System for Mobile communications (GSM) network (EDGE), a Second Generation (2G) network, a Third Generation (3G) network, a Fourth Generation (4G) network, 2.75G network, a 3rd Generation Partnership Project (3GPP) network including 3GPP Long Term Evolution (LTE) network, a 3rd Generation Partnership Project 2 (3GPP2) network including 3GPP2 Ultra Mobile Broadband (UMB) network, a Wireless Fidelity (WiFi) network, or any other type of communication network.

For over 100 years, telecommunications systems treated voice as an acoustic object. Voice, instead, is in essence a means of communication. Mobile communications devices can be built with enormous processing power. The devices can integrate codecs with dialog-level processing, such as, for example, dialog state modeling; taxonomies of different types of dialog activity; models of the phonetic-acoustic properties of the non-lexical aspects of speech, including prosody, filled pauses, "conversational grunts," and laughter; incremental dialog processing; and models of the dynamic interplay between two dialog participants at the sub-second level.

Current voice codecs adapt to channel characteristics, but the lack of any adaptation to importance, communicative value, or dialog-relevance results in lower effective audio quality and/or higher average bitrate use than is necessary. Traditionally the best choice of codec depends mostly on the application and is statically selected for that purpose, from limited-resource situations to high-end wideband teleconferencing situations.

When making a voice over Internet protocol ("VoIP") telephone call, for example, a codec is utilized to convert the voice of the caller into a digital signal. There are many different codecs available for converting the voice of the caller to a digital signal. The terms speaker and listener are used for convenience of explanation to refer to the main speaker and main listener at any given time, but are intended to also refer to two of the two or more participants in dialog regardless of whether both or all are speaking, or none are, or the speaking and listening roles are otherwise unstable.

There are today a variety of exemplary and commonly used voice codecs, varying in data rate and quality. For example codec G.711 encodes the voice of the caller at 64 kbps while codec G.729 encodes at 8 kbps per second. The quality of the voice heard by the listener of VoIP telephone is superior when sampling the speech more accurately and at a higher rate. Using such codecs requires a greater bandwidth to effectively transmit calls between VoIP telephones. Analogous quality-bandwidth tradeoffs are present for video and multimedia transmissions.

Figure 4:
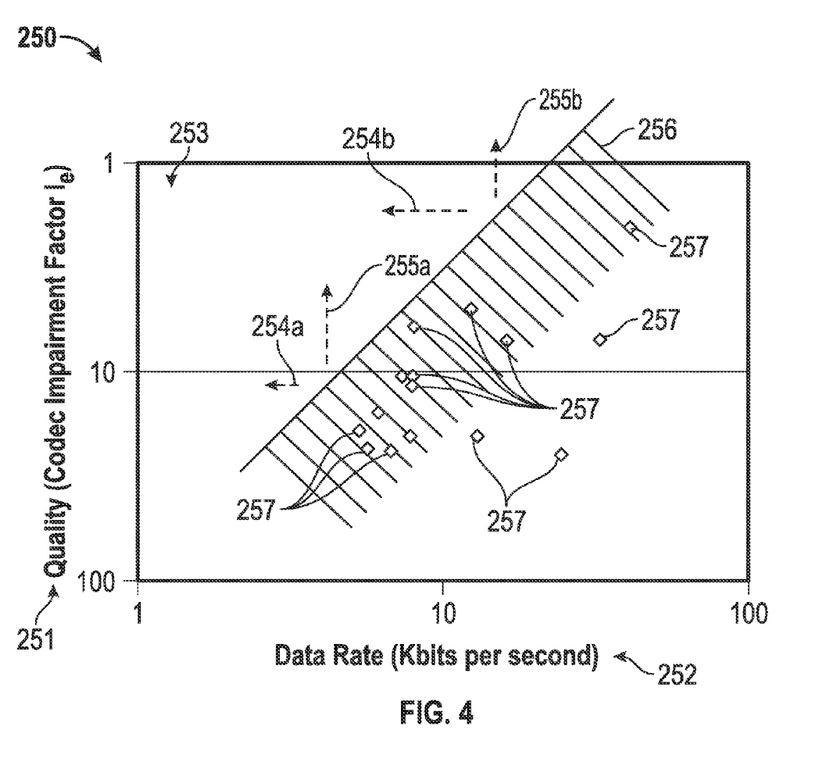
FIG. 4 illustrates an exemplary graphical illustration of voice quality compared to data rate, according to an embodiment.

FIG. 4 illustrates an exemplary graphical illustration 250 of voice quality 251 compared to data rate 252, according to an embodiment. Voice codecs involve a trade-off between voice quality 251 and data bitrate 252. The main technical challenge in codec design is obtaining better performance-data rate trade-offs while attempting to move the operating point towards the upper left corner 253 of the graphical illustration 250 in FIG. 4, that is, to escape the limited operating region 256 available to non-adaptive codecs 257. Depending on application needs, the benefits can be taken in the form of reduced data bitrate 252 (i.e., horizontal arrow 254a and horizontal arrow 254b) or improved voice quality 251 (i.e., vertical arrow 255a and vertical arrow 255b) or some combination of reduced data bitrate 252 and improved voice quality 251.

Proposed techniques for voice codec improvements exploit knowledge about the specifics of speech signals, but, problematically, of only two main kinds. First, there is psycho-acoustical knowledge of what information can be elided because the human ear will be insensitive to it even if transmitted. Second, there is articulatory knowledge of how the human vocal folds and resonators work, enabling transmission of only parameters that concisely describe their states. Adaptive codecs, such as, for example, ADPCM, QCELP, AMR, G.718 annex B, G.729.1 annex E, SILK, and Speex, choose in real-time which data rate or base codec to use. This choice is based on either the channel constraints, the computational resources available for encoding, or superficial characteristics of the speaker's voice (e.g., pitch height or the presence of voicing, for example). The disclosed embodiments improve codecs by exploiting patterns of occurrence of important content in dialog dynamics as produced by speakers. These reflect fundamental cognitive processing constraints, not only the physical and psycho-acoustic properties of the ear, larynx, and tongue.

Similarly, existing video codecs use properties of images or image sequences, devoting higher bitrate to frames which exhibit greater change relative to the previous frame, or higher bitrate to regions within a frame which are more complex or denser in information. Many of these techniques also rely, fundamentally, on models of what humans perceive as significant or salient, or models of human visual attention. Typically significant aspects of video include fast movements, and also objects of interest, such as human figures and especially hands and faces, the latter being a particular focus of codecs applied to conversational uses of video. Such techniques have been developed and applied not only to teleconferencing but also for offline applications where more processing time is available, such as video compression and summarization. However these perceptual models are derived mostly from passive viewing behavior and thus do not exploit information about what is important to humans in a dialog situation, neither in regards to which frames are most significant nor in regards to which regions of those frames are most significant, and this limits the effectiveness of all existing video codecs.

Figure 5:
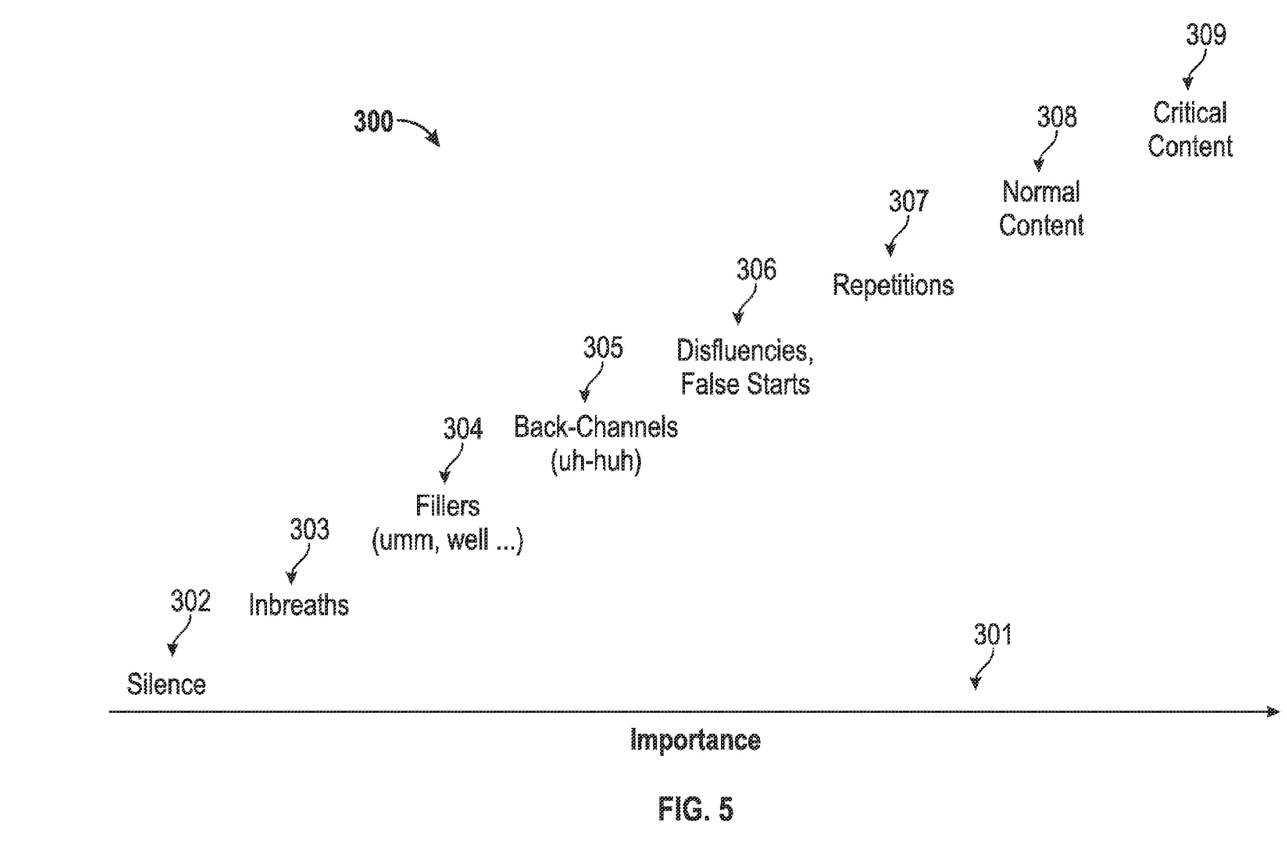
FIG. 5 illustrates an exemplary graphical illustration of relative importance of speech, according to an embodiment.

FIG. 5 illustrates an exemplary graphical illustration 300 of relative importance of speech 301, according to an embodiment. In human dialog, everything said is not equally important, as illustrated in FIG. 5. Speech importance 301 increases from less important silence 302, to in-breaths 303, to fillers 304 (e.g., "um", "well"), to back-channels (e.g., "uh-huh"), to disfluencies and false starts 306, to repetitions 307, to normal content 308, to more important critical content 309. All voice transmissions 304-309 in circuit-based telephony are transmitted at the same quality level. Due to preprocessing by voice activity detectors (VADs), average bandwidth requirements are reduced by omitting the transmission of silence and other non-speech sounds. Speech is transmitted only when detected as present with comfort noise generated at the terminal end during periods detected as having no speech.

Interest in audio codecs using time-varying quality has grown with the advent of Voice over Internet Protocol (VoIP) and over other packet-switched networks. Perceptual studies of the human-factors effects of quality-level transitions have mostly indicated that these are disliked, even for gradual transitions, and even for transitions from poor quality to better quality. Taken at face value, such studies may be thought to show that importance-adaptive variation in voice quality, where there are frequent quality-level transitions, will obviously be strongly disliked by users. However these studies are less relevant than they appear, for two reasons. First, these studies are lacking in realism, involving subjects listening to dialog or even monolog audio, rather than actually engaging in dialog. Second, these studies have elicited judgments of preference or perceived channel quality, rather than of suitability of the channel for conducting business efficiently or for supporting enjoyable, comfortable conversations. People manage to continue conversations without much trouble while the wind blows and gusts, for example, a situation perceptually not entirely dissimilar to channel variations. While wind gusts are certainly annoying, in real conversations, such noise variations are easily dealt with.

To estimate the potential value of importance-adaptive quality, statistical analyses and modeling of importance variation in dialog were performed. Two people annotated 20 minutes of random dialogs for importance on a 5-point scale. Overall 38% of the in-speech frames (of 10 milliseconds each) were labeled as 4 (normal) in importance, 37% a 5 (high) and the remaining 25% in one of the lower categories. While perceptions of importance vary, doubtless because importance has multiple facets, including at least objective informational importance and control/meta-dialog importance to the participants, the correlation between the two annotators' assignment importance values was 0.92, indicating high agreement.

Based on the distribution and the correlation, it is possible to estimate the achievable benefit as about a 35% a reduction in datarate with no degradation in perceived quality. Alternatively, if the benefit is taken in improved quality for the same datarate, there is an estimated potential gain of up to 15 R points, which is worth about 10 dB and is almost the difference between ratings of Fair and Poor, or between Good and Fair, in terms of the 5-point Mean Opinion Score.

Further, experiments in predicting the importance label for each frame from various automatically-computable prosodic features gave good results. Using 78 prosodic features computed over the 6-second local context windows centered about the frame of interest and a linear regression model gave predictions which correlated at 0.86 with the human judgments, not much below than the correlation between the two annotators. Use of only past-context features, without even 10 milliseconds of look-ahead, gave only slightly worse performance, 0.71 versus 0.74 in terms of r-squared.

Figure 6:
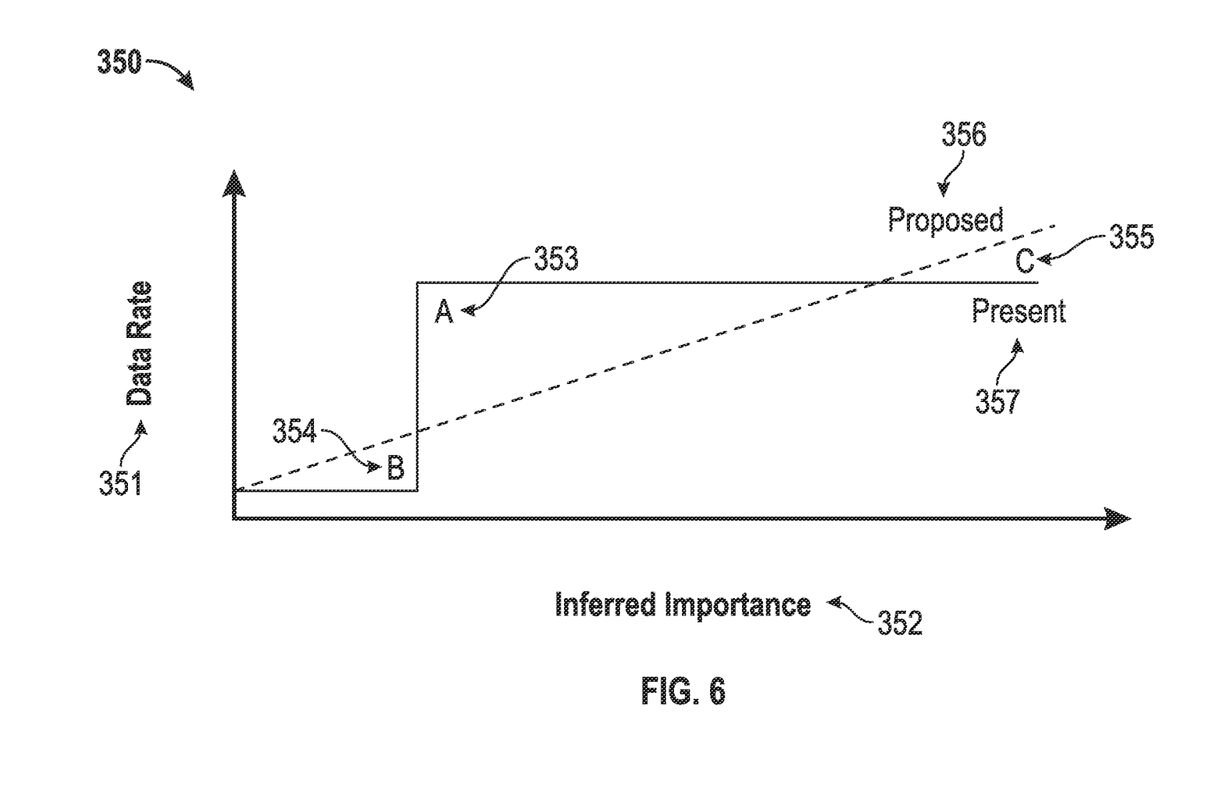
FIG. 6 illustrates an exemplary graphical illustration of data rate compared to estimated importance of speech, according to an embodiment.

FIG. 6 illustrates an exemplary graphical illustration 350 of data rate 351 compared to estimated importance of speech 352, according to an embodiment. In the disclosed embodiments, more important voice communications are transmitted with greater accuracy 356. Bits saved by less fidelity in the encoding of less important utterances (location A 353), such as, for example, components such as fillers 304, back-channels 305, and disfluencies and false starts 306, from FIG. 5, are instead used to transmit more important speech (location C 355). Meta-communicative signals are transmitted concisely. Meta-communicative signals include, for example, noisy in-breaths 303 and noisy exhalations that provide cues to the interlocutor about upcoming speech (location B 354). In another embodiment, the importance-value estimation step is bypassed to directly map from prosodic features to the target datarate.

Prior insufficient solutions 357 omit the transmission of nonspeech but significant vocal sounds, devote too much bandwidth to unimportant words, and devote too little to important words. The focus of the disclosed embodiments is to transmit all of these with appropriate quality. The perceived and actual communicative utility of the channel will improve without a net increase in the average bit rate. Conversely, the same technique can be used to decrease the bit rate while maintaining channel quality. In this manner, for the same average dialog transmission quality, measured objectively using metrics such as the signal-to-noise-ratio, the perceptual quality will be higher with the adaptive system, when evaluated on metrics such as intelligibility and preference.

Different dialog types will vary in the benefits obtained, with likely strong benefits for negotiation and other unstructured dialog types and lesser benefits for more structured, information-exchange dialogs Such benefits may enable, among other advantages: cutting the spectrum requirement or increasing the number of simultaneous calls for a given transmission infrastructure, for example; cutting the number of base stations required to cover a given area; increasing by half the battery life of mobile telephones and radios, or decreasing by a third the battery weight; cutting the traffic from any individual warfighter's radio, making his location less detectable; and reducing the need for push-to-talk systems.

If the invention is used to increase quality for a given bitrate, this could provide:

reduced misunderstandings;

more efficient dialogs by reducing the need to repeat poorly transmitted words;

users' cognitive load lowered relative to communicating over a poor channel;

reduced need to train professional users such as air traffic controllers and military and police personnel to use controlled languages for some purposes;

reduced need to travel (e.g., report back to headquarters to talk about things that cannot be discussed satisfactorily over scratchy connections);

better performance of remote speech-processing applications such as data mining, event detection, word spotting, translation, and behavior analysis; and the same quality of communication at higher (e.g., perhaps 10 dB higher) ambient noise levels, or for users speaking more quietly (e.g., perhaps at half the loudness), thus reducing the risk of being overheard by eavesdroppers and reducing the risk of inadvertently annoying bystanders.

Some of the disclosed embodiments rely on quantifying the importance of speech. For written texts, information theory provides ways to quantify the entropy for any word. Such techniques, however, are not directly applicable to spoken language. Frame-by-frame importance estimates are needed, with little or no lag. For this purpose, contextual prosodic information is indicative, as is context. For example in dialog, the informativeness of a word by speaker A may depend greatly on the previous words by speaker B.

Figure 7:
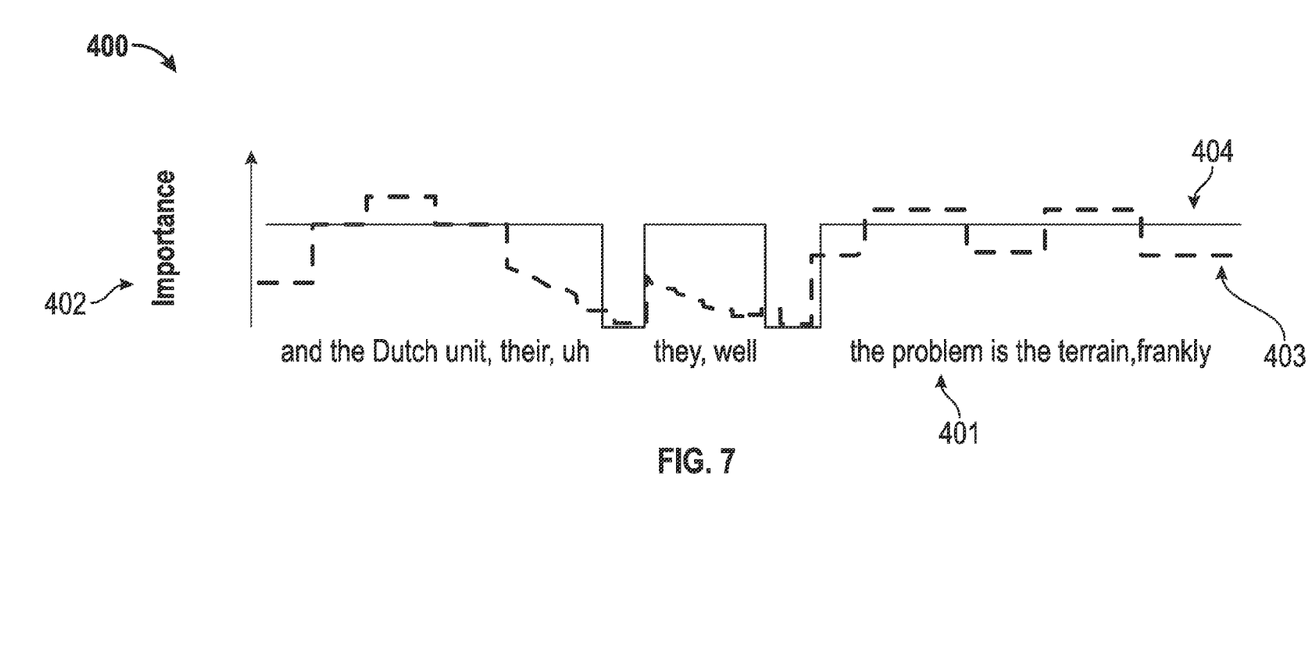
FIG. 7 illustrates an exemplary graphical illustration of utterance importance as it varies over time, according to an embodiment.

FIG. 7 illustrates an exemplary graphical illustration 400 of utterance importance varies over time, according to an embodiment. Different words 401 can vary in importance 402, as indicated by dashed line 403. Importance also varies within words, often dropping over time as the words are drawn out. In contrast, existing speech transmission systems implicitly have a crude model of importance 404 in which all speech is equally important, and all non-speech, including in-breaths and other communicatively significant non-speech sounds, has zero importance. Naive native-speaker judges can annotate the perceived importance or "content density" in dialogs. For example annotations like 403 can be done across regions on a scale from 0 to 4, as illustrated in FIG. 7. From such training data, one can automatically create a value predictor using one of many well-known machine learning techniques.

Figure 8:
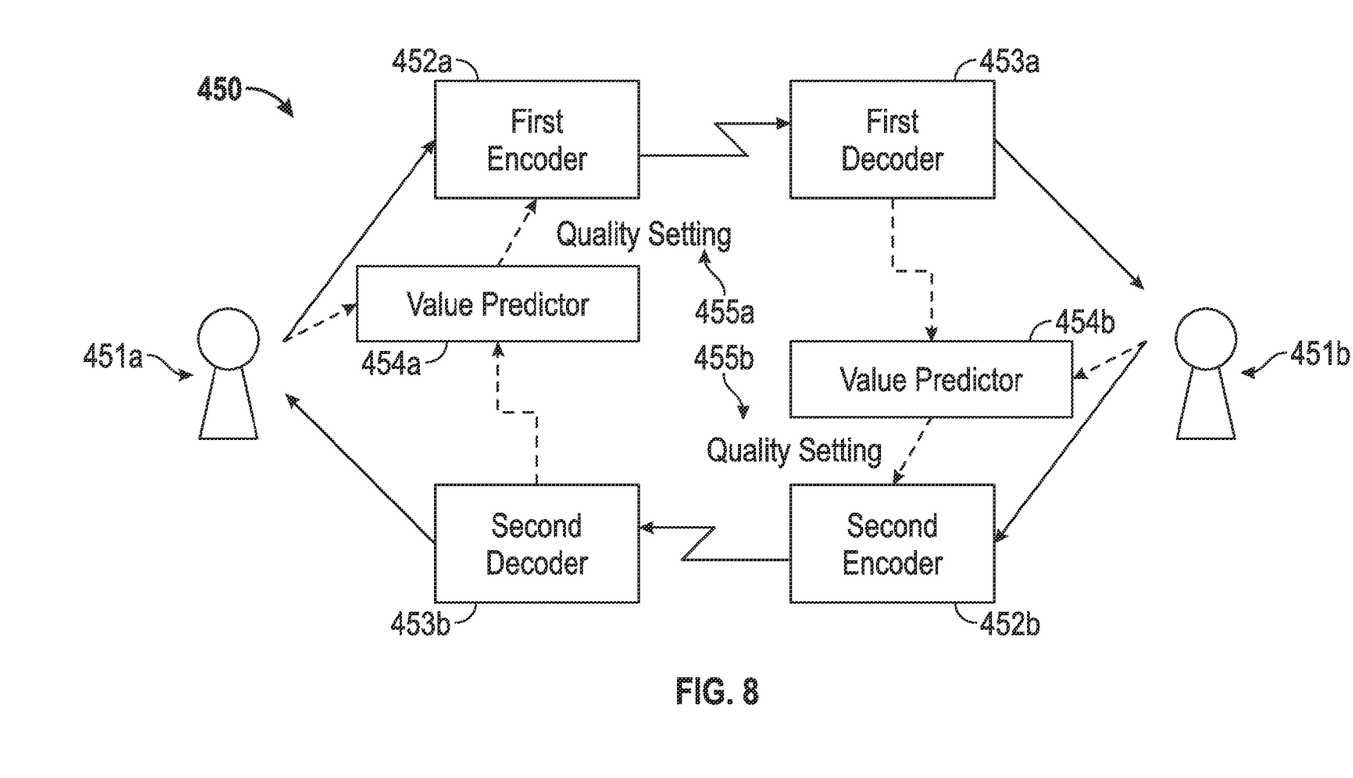
FIG. 8 illustrates an exemplary block diagram of a real-time, bidirectional voice transmission system with importance-proportional, dynamically-varying quality, according to an embodiment.

FIG. 8 illustrates an exemplary block diagram 450 of a real-time, bidirectional voice transmission system with importance-proportional, dynamically-varying quality, according to an embodiment. Such a bidirectional system comprises a first encoder 452a/first decoder 453a combination and a second encoder 452b/second decoder 453b combination, either or both of which may be importance-adaptive. Value predictors 454a, 454b receive speakers' 451a, 451b information directly and/or interlocutors' information via decoders 453b, 453a. Value predictors 454a, 454b send speakers' 451b, 451a voice quality settings 455a, 455b to first encoder 452a and second encoder 452b. Value predictors 454a, 454b assess the importance of an upcoming voice data frame in real time for the disclosed adaptive codec to vary dialog quality in real time. The data frame can include at least one of an audio data frame and a video data frame. In one embodiment, value predictors 454a, 454b assess clients' 451a, 451b speech importance directly and proportionally to the estimated importance. In other embodiments, value predictors 454a, 454b assess clients' 451a, 451b speech importance after automatically detecting various ongoing dialog activities and events. Such assessment and events can include, for example, information suitable to appear in summaries, decision points, hotspots, laughter, fillers, disfluencies, and back-channels. Some of the disclosed embodiments rely on an intermediary between the observable properties of dialog and the desired quality setting. This intermediary is here termed dialog importance value, although this may not correspond to importance as defined by any existing theory or model.

In some embodiments the value predictor utilizes prosodic features (e.g., pitch, energy, and timing) of clients' 451a, 451b speech, without requiring use of the lexical content for importance assessment. In other embodiments, the codec varies clients' datarate in non-real time, such as, for example, for compressing audio recordings of dialogs or meetings. A Dialogue Value Predictor can be implemented using various prosodic features, from both speakers, as input. Both raw, low-level spectral, prosodic features, and composite features known to be of relevance, are possible inputs. For example, a spectrally-stable sound with low and flat pitch is likely to be of low importance, likely comprising a filler or back-channel. A region with high pitch range, pitch height, volume, and overlap is likely to be of high importance.

One approach to predicting content density and importance is by implementing black-box machine learning, using various algorithms. Exemplary algorithms can include HMMs, neural networks, LDCRF and LSTM, for example. Dialog surface manifestations (e.g., speaking rate, pitch range, etc.) are densely multifunctional and developing a predictor may require additional analysis, such as manual, semi-automated, or automated analysis. Analysis and content-density estimation may also include classifying the dialog activity or situation (e.g., stalling, agreeing, laughing, listening, trying to take the floor, stumbling over what to say, etc.).

Prediction quality can be measured as the frame-by-frame correlation between the predicted values and the actual human-given annotations in the corpus for unseen test data. A correlation of 0.7 or higher is preferred. A single predictor is problematic due to dialogue heterogeneity across dialogue types, dialects, languages, genders, etc. Predictor performance can be measured as a function of these variables, and multiple or parameterized predictors can be used. Consideration of both the speaker's recent prosodic history and that of the interlocutor is important. Joint modeling of dialog state may improve prediction performance. In real-time embodiments, line delay invariably arises. The value predictors can be made robust to various values of the delay by various methods, including training them using dialog data recorded in conditions with line delay or by modeling the delay locally within the value predictor. In another embodiment, the mental-state and/or dialog-state modeling techniques are used as factors to directly set the datarate without explicitly computing an importance value.

The codec adaptation can further include a means to monitor the suitability of the ongoing adaptations and attenuate them or turn them off as appropriate for the specific ongoing dialog. A dialog-detector can determine whether the dialog observed properly matches a dialogue model, or is similar to the dialogs in the corpus used to train the model. If similar, then the data-rate adaptations should be applied to the dialogue. The system and method described herein can dynamically predict upcoming dialogue importance and further provide confidence estimates regarding the accuracy of these importance estimates. Such confidence measures can be used to determine the degree of suitability of applying the adaptations. The methods described herein can further be utilized for real-time, bidirectional transmission, as in mobile telephone, fixed-circuit telecommunications including videoconferencing, and internet telephony. The disclosed embodiments can be used as part of communications-support systems, for example, those that translate speech in various languages, otherwise aid people speaking different languages, or assist the handicapped.

Figure 9:
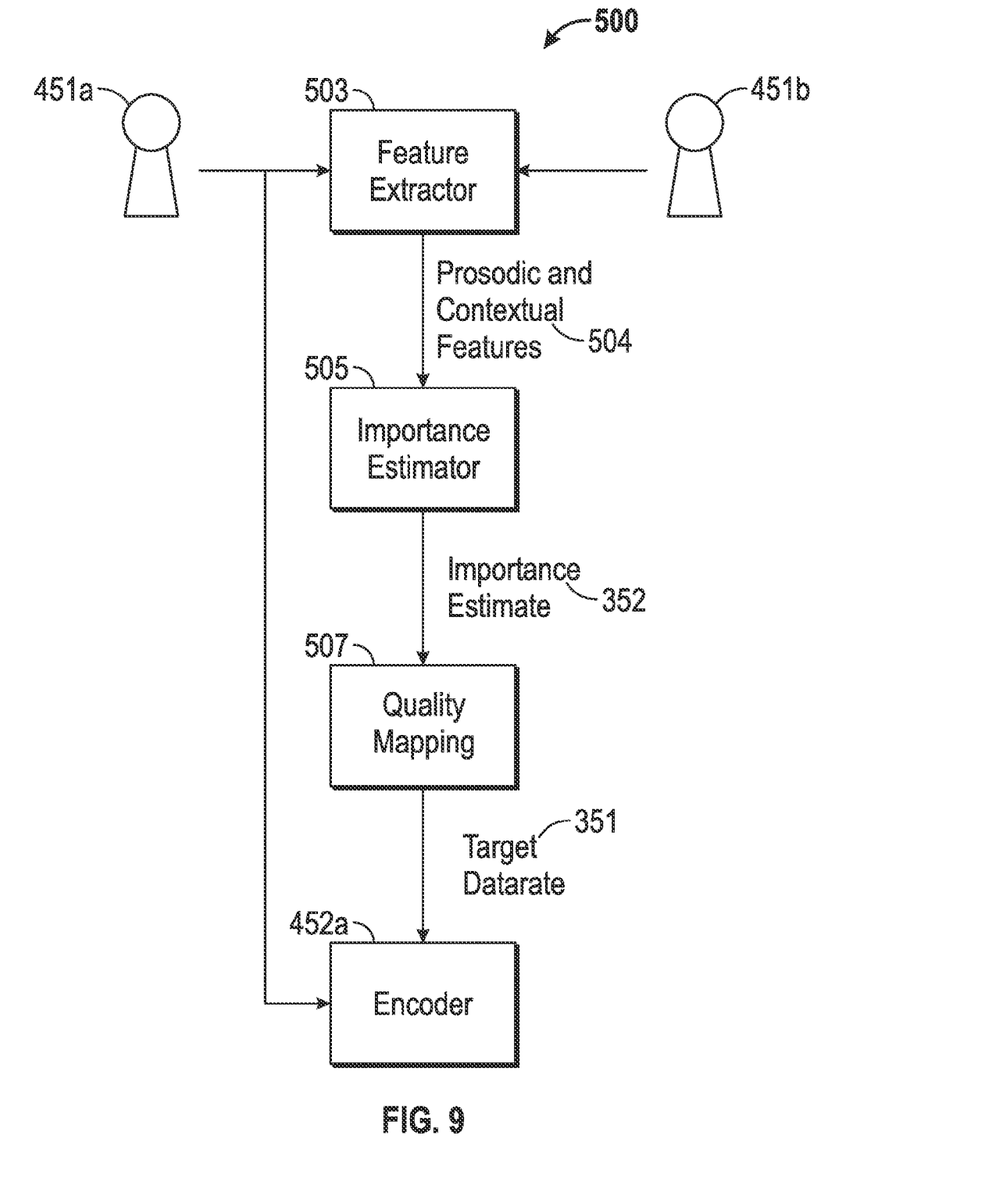
FIG. 9 illustrates an exemplary graphical illustration of the Value Predictor and associated components, according to an embodiment.

FIG. 9 illustrates an exemplary graphical illustration 500 of the Value Predictor, according to an embodiment. The audio of the local speaker 451a and of the remote interlocutor 451b feed into a feature extractor 503. The extracted features 504 are then used by the importance estimator/predictor 505 to estimate the importance value 352 of the next frame. According to this importance value, the quality mapping 507 determines the target audio quality and datarate 351 which is the quality-setting parameter which controls the behavior of the encoder 452a. In some embodiments, the Importance Estimator 505 and Quality Mapping 507 may be combined into one module.

Based on the foregoing it can be appreciated that a number of different embodiments, preferred and alternative are disclosed herein. For example, in one embodiment, a method for dynamic codec adaptation is disclosed. The method can comprise the steps of: estimating an importance value of a data frame utilizing information; dynamically varying a data rate based on the estimated the importance value of the data frame; devoting a greater bitrate to data frame quality in real time for a data frame with an assigned high importance value; and devoting less bitrate to data frame quality in real time for a data frame with an assigned low importance value.

In other embodiments, the data frame comprises at least one of an audio data frame and a video data frame and information comprises at least one of a prosodic feature and a model of dialog dynamics, wherein the prosodic feature comprises at least one of pitch height of a speaker or a listener, pitch range of the speaker or the listener, speaking rate of the speaker or the listener, volume of the speaker or the listener, voicing properties of the speaker or the listener, and/or phonetic properties of the speaker or the listener. In other embodiments, the method further comprises transmitting important voice frames, communications, and utterances with greater accuracy and a certain quality level for a data rate, wherein important voice frames comprise audio with a high pitch range, pitch height, volume, and overlapped speech by multiple speakers.

In another embodiment, the method includes steps for gathering inferences on a transient mental state of a speaker comprising at least one of the speaker trying to think of a word, the speaker expressing confusion, the speaker expressing sympathy, the speaker expressing frustration, and the speaker expressing determination; gathering inferences of a current transient mental state of a listener; and gathering inferences of a current dialog state or an upcoming dialog state, wherein the current dialog state and the upcoming dialog state are modeled based on taxonomy of dialog states comprising at least one of floor-holding, giving short feedback, floor-yielding, asking a question, waiting for an answer; or a dimensional value comprising at least one of degree of engagement, degree of certainty, degree of positive feeling, and degree of local dominance.

In an embodiment of the method, the estimating the importance value of the data frame utilizing information further comprises: measuring sub-metrics, the sub-metrics comprising at least one of objective informational importance, dialog-control importance, interpersonal-relationship-management importance, and meta-dialog importance; analyzing an inferred current utterance type of a speaker, an inferred past utterance type of the speaker, or future-expected utterance type of the speaker, the utterance types comprising a question, a statement, and an acknowledgement; analyzing a timing relative to the current frame of the utterance types, wherein the timing comprises a start time and an end time; gathering utterance types of an interlocutor; analyzing behavior of a speaker or a listener including eye gaze, facial gestures, and hand gestures; and analyzing an output of a speech recognizer.

In another embodiment, the method further comprises normalizing a local feature relative to an average behavior of an interlocutor with average behavior computed over at least one of a longer time frame, an entire dialog, or a previous dialog or set of dialogs. In yet another embodiment, the method further comprises indicating which aspects need to be most accurately transmitted, for a speech frame said aspects comprising at least one of a high-frequency spectral region and pitch, and for a video frame said aspects comprising at least one of a region, an object, a movement, a chroma value, a luma value, a spatio-temporal feature, and a spatial frequency range.

Another embodiment discloses a system for dynamic codec adaptation comprising a processor; a data bus coupled to the processor; and a computer-usable non-transitory storage medium embodying computer code, the computer-usable non-transitory storage medium being coupled to the data bus, the computer program code comprising program instructions executable by the processor, the program instructions comprising: program instructions to estimate an importance value of a data frame utilizing information; program instructions to dynamically vary a data rate based on the estimated the importance value of the data frame; program instructions to devote a greater bitrate to data frame quality in real time for a data frame with an assigned high importance value; and program instructions to devote less bitrate to data frame quality in real time for a data frame with an assigned low importance value. Embodiments of the system include program instructions implementing the method.

In yet another embodiment, a computer-usable non-transitory storage device storing computer program code for dynamic codec adaptation is disclosed. The computer program code comprises program instructions executable by a processor. The program instructions comprises: program instructions to estimate an importance value of a data frame utilizing information; program instructions to dynamically vary a data rate based on the estimated the importance value of the data frame; program instructions to devote a greater bitrate to data frame quality in real time for a data frame with an assigned high importance value; and program instructions to devote less bitrate to data frame quality in real time for a data frame with an assigned low importance value. Embodiments of the computer-usable non-transitory storage device storing computer program code include program instructions implementing the method.

It will be appreciated that variations of the above-disclosed and other features and functions, or alternatives thereof, may be desirably combined into many other different systems or applications. Furthermore, various presently unforeseen or unanticipated alternatives, modifications, variations or improvements therein may be subsequently made by those skilled in the art which are also intended to be encompassed by the following claims.

What is claimed is:

1. A method for dynamic codec adaptation, comprising:
    estimating an importance value of a data frame utilizing information, wherein estimating said importance value of said data frame utilizing said information further comprises measuring sub-metrics, said sub-metrics comprising at least one of objective informational importance, dialog-control importance, interpersonal-relationship-management importance, and meta-dialog importance;
    dynamically varying a data rate based on said estimated said importance value of said data frame;
    devoting a greater bitrate to data frame quality in real time for a data frame with an assigned high importance value;
    devoting less bitrate to data frame quality in real time for a data frame with an assigned low importance value; and
    transmitting important voice frames, communications, and utterances with greater accuracy and a certain quality level for a data rate, wherein important voice frames comprise audio with a high pitch range, pitch height, volume, and overlapped speech by multiple speakers.

2. The method of claim 1 wherein said data frame comprises at least one of an audio data frame and a video data frame and wherein said information comprises at least one of a prosodic feature and a model of dialog dynamics, wherein said prosodic feature comprises at least one of pitch height of a speaker or a listener, pitch range of said speaker or said listener, speaking rate of said speaker or said listener, volume of said speaker or said listener, voicing properties of said speaker or said listener, phonetic propertes of said speaker or said listener.

3. The method of claim 1 further comprising:
    gathering inferences on a transient mental state of a speaker comprising at least one of said speaker trying to think of a word, said speaker expressing confusion, said speaker expressing sympathy, said speaker expressing frustration, and said speaker expressing determination;
    gathering inferences of a current transient mental state of a listener;
    and gathering inferences of a current dialog state or an upcoming dialog state, wherein said current dialog state and said upcoming dialog state are modeled based on taxonomy of dialog states comprising at least one of floor-holding, giving short feedback, floor-yielding, asking a question, waiting for an answer; or
    a dimensional value comprising at least one of degree of engagement, degree of certainty, degree of positive feeling, and degree of local dominance.

4. The method of claim 1 wherein estimating said importance value of said data frame utilizing information further comprises:
    analyzing an inferred current utterance type of a speaker, an inferred past utterance type of said speaker, or future-expected utterance type of said speaker, said utterance types comprising a question, a statement, and an acknowledgement;
analyzing a timing relative to said current frame of said utterance types, wherein said timing comprises a start time and an end time;
gathering utterance types of an interlocutor; analyzing behavior of a speaker or a listener including eye gaze, facial gestures, and hand gestures; and
analyzing an output of a speech recognizer.

5. The method of claim 1 further comprising normalizing a local feature relative to an average behavior of an interlocutor with average behavior computed over at least one of a longer time frame, an entire dialog, or a previous dialog or set of dialogs.

6. The method of claim 1 further comprising indicating which aspects need to be most accurately transmitted, for a speech frame said aspects comprising at least one of a high-frequency spectral region and pitch, and for a video frame said aspects comprising at least one of a region, an object, a movement, a chroma value, a luma value, a spatia-temporal feature, and a spatial frequency range.

7. A system for dynamic codec adaptation, comprising:
a processor;
a data bus coupled to said processor; and
a computer-usable non-transitory storage medium embodying computer code, said computer-usable non-transitory storage medium being coupled to said data bus, said computer program code comprising program instructions executable by said processor, said program instructions comprising:
program instructions to estimate an importance value of a data frame utilizing information, wherein said program instructions to estimate said importance value of said data frame further comprises program instructions to measure sub-metrics, said sub-metrics comprising at least one of objective informational importance, dialog-control importance, interpersonal-relationship-management importance, and meta-dialog importance;
program instructions to dynamically vary a data rate based on said estimated said importance value of said data frame;
program instructions to devote a greater bitrate to data frame quality in real time for a data frame with an assigned high importance value;
program instructions to devote less bitrate to data frame quality in real time for a data frame with an assigned low importance value; and
program instruction to transmit important voice frames, communications, and utterances with greater accuracy and a certain quality level for a data rate, wherein important voice frames comprise audio with a high pitch range, pitch height, volume, and overlapped speech by multiple speakers.

8. The system of claim 7 wherein said data frame comprises at least one of an audio data frame and a video data frame and wherein said information comprises at least one of a prosodic feature and a model of dialog dynamics, wherein said prosodic feature comprises at least one of pitch height of a speaker or a listener, pitch range of said speaker or said listener, speaking rate of said speaker or said listener, volume of said speaker or said listener, voicing properties of said speaker or said listener, phonetic properties of said speaker or said listener.

9. The system of claim 7 further comprising:
program instructions to gather inferences on a transient mental state of a speaker comprising at least one of said speaker trying to think of a word, said speaker expressing confusion, said speaker expressing sympathy, said speaker expressing frustration, and said speaker expressing determination;
program instructions to gather inferences of a current transient mental state of a listener; and
program instructions to gather inferences of a current dialog state or an upcoming dialog state wherein said current dialog state and said upcoming dialog state are modeled based on taxonomy of dialog states comprising at least one of floor-holding, giving short feedback, floor-yielding, asking a question, waiting for an answer; or
a dimensional value comprising at least one of degree of engagement, degree of certainty, degree of positive feeling, and degree of local dominance.

10. The system of claim 7 wherein estimating said importance value of said data frame utilizing information further comprises:
program instructions to analyze an inferred current utterance type of a speaker, an inferred past utterance type of said speaker, or future-expected utterance type of said speaker, said utterance types comprising a question, a statement, and an acknowledgement; program instructions to analyze a timing relative to said current frame of said utterance types, wherein said timing comprises a start time and an end time; program instructions to gather utterance types of an interlocutor;
program instructions to analyze behavior of a speaker or a listener including eye gaze, facial gestures, and hand gestures; and program instructions to analyze an output of a speech recognizer.

11. The system of claim 10 further comprising program instructions to normalize a local feature relative to an average behavior of an interlocutor with average behavior computed over at least one of a longer time frame, an entire dialog, or a previous dialog or set of dialogs.

12. The system of claim 10 further comprising program instructions to indicate which aspects need to be most accurately transmitted, for a speech frame said aspects comprising at least one of a high-frequency spectral region and pitch, and for a video frame said aspects comprising at least one of a region, an object, a movement, a chroma value, a luma value, a spatio-temporal feature, and a spatial frequency range.

13. A computer-usable non-transitory storage device storing computer program code for dynamic codec adaptation, said computer program code comprising program instructions executable by a processor, said program instructions comprising:
program instructions to estimate an importance value of a data frame utilizing information, wherein said program instructions to estimate said importance value of said data frame utilizing said information comprises program instructions to measure sub-metrics, said sub-metrics comprising at least one of objective informational importance, dialog-control importance, interpersonal-relationship-management importance, and meta-dialog importance;
program instructions to dynamically vary a data rate based on said estimated said importance value of said data frame;
program instructions to devote a greater bitrate to data frame quality in real time for a data frame with an assigned high importance value; and program instructions to devote less bitrate to data frame quality in real time for a data frame with an assigned low importance value; and program instructions to transmit important voice frames, communications, and utterances with greater accuracy and a certain quality level for a data rate, wherein important voice frames comprise audio with a high pitch range, pitch height, volume, and overlapped speech by multiple speakers.

14. The computer-usable non-transitory storage device of claim 13 wherein said data frame comprises at least one of an audio data frame and a video data frame and wherein said information comprises at least one of a prosodic feature and a model of dialog dynamics, wherein said prosodic feature comprises at least one of pitch height of a speaker or a listener, pitch range of said speaker or said listener, speaking rate of said speaker or said listener, volume of said speaker or said listener, voicing properties of said speaker or said listener, phonetic properties of said speaker or said listener.

15. The computer-usable non-transitory storage device of claim 13 further comprising:

program instructions to gather inferences on a transient mental state of a speaker comprising at least one of said speaker trying to think of a word, said speaker expressing confusion, said speaker expressing sympathy, said speaker expressing frustration, and said speaker expressing determination;

program instructions to gather inferences of a current transient mental state of a listener; and program instructions to gather inferences of a current dialog state or an upcoming dialog state wherein said current dialog state and said upcoming dialog state are modeled based on taxonomy of dialog states comprising at least one of floor-holding, giving short feedback, floor-yielding, asking a question, waiting for an answer; or a dimensional value comprising at least one of degree of engagement, degree of certainty, degree of positive feeling, and degree of local dominance.

16. The computer-usable non-transitory storage device of claim 13 wherein estimating said importance value of said data frame utilizing information further comprises:

program instructions to normalize a local feature relative to an average behavior of an interlocutor with average behavior computed over at least one of a longer time frame, an entire dialog, or a previous dialog or set of dialogs;

program instructions to analyze an inferred current utterance type of a speaker, an inferred past utterance type of said speaker, or future-expected utterance type of said speaker, said utterance types comprising a question, a statement, and an acknowledgement;

program instructions to analyze a timing relative to said current frame of said utterance types, wherein said timing comprises a start time and an end time; program instructions to gather utterance types of an interlocutor;

program instructions to analyze behavior of a speaker or a listener including eye gaze, facial gestures, and hand gestures; and program instructions to analyze an output of a speech recognizes.

17. The computer-usable non-transitory storage device of claim 16 further comprising program instructions to indicate which aspects need to be most accurately transmitted, for a speech frame said aspects comprising at least one of a high-frequency spectral region and pitch, and for a video frame said aspects comprising at least one of a region, an object, a movement, a chroma value, a luma value, a spatia-temporal feature, and a spatial frequency range.

* * * * *